United States Patent
Ruhlman

[15] 3,691,773
[45] Sept. 19, 1972

[54] WATER BARRIER FLOTATION CURTAIN

[72] Inventor: Jon R. Ruhlman, Cleveland Heights, Ohio

[73] Assignee: Preformed Line Products Company, Cleveland, Ohio

[22] Filed: June 22, 1970

[21] Appl. No.: 48,323

[52] U.S. Cl. .................................61/1, 4/171, 61/4, 61/5
[51] Int. Cl. .........................E02b 15/04, E02b 3/06
[58] Field of Search......61/5, 1, 4, 29; 114/.5 T, .5 F; 4/171, 172

[56] References Cited

UNITED STATES PATENTS

| 3,537,587 | 11/1970 | Kain | 61/1 F |
| 3,476,246 | 11/1969 | Dahan | 61/1 F X |
| 307,393 | 10/1884 | Hyde | 61/5 |
| 3,029,606 | 4/1962 | Olsen | 61/5 |

FOREIGN PATENTS OR APPLICATIONS

| 1,529,754 | 1968 | France | 61/1 F |
| 2,009,655 | 1970 | France | 61/1 F |
| 187,135 | 1956 | Austria | 61/1 |

Primary Examiner—Jacob Shapiro
Attorney—Hume, Clement, Hume & Lee

[57] ABSTRACT

A water barrier flotation curtain for use in a body of water comprising a barrier having a sandwich-like construction, which is substantially vertical having an upper edge and a lower edge, a flotation means positioned within the barrier and adapted to float beneath the surface of the water, and an anchor attached to the lower edge of the barrier wherein the lower edge of the barrier substantially follows the contour of the floor of the body of water.

27 Claims, 19 Drawing Figures

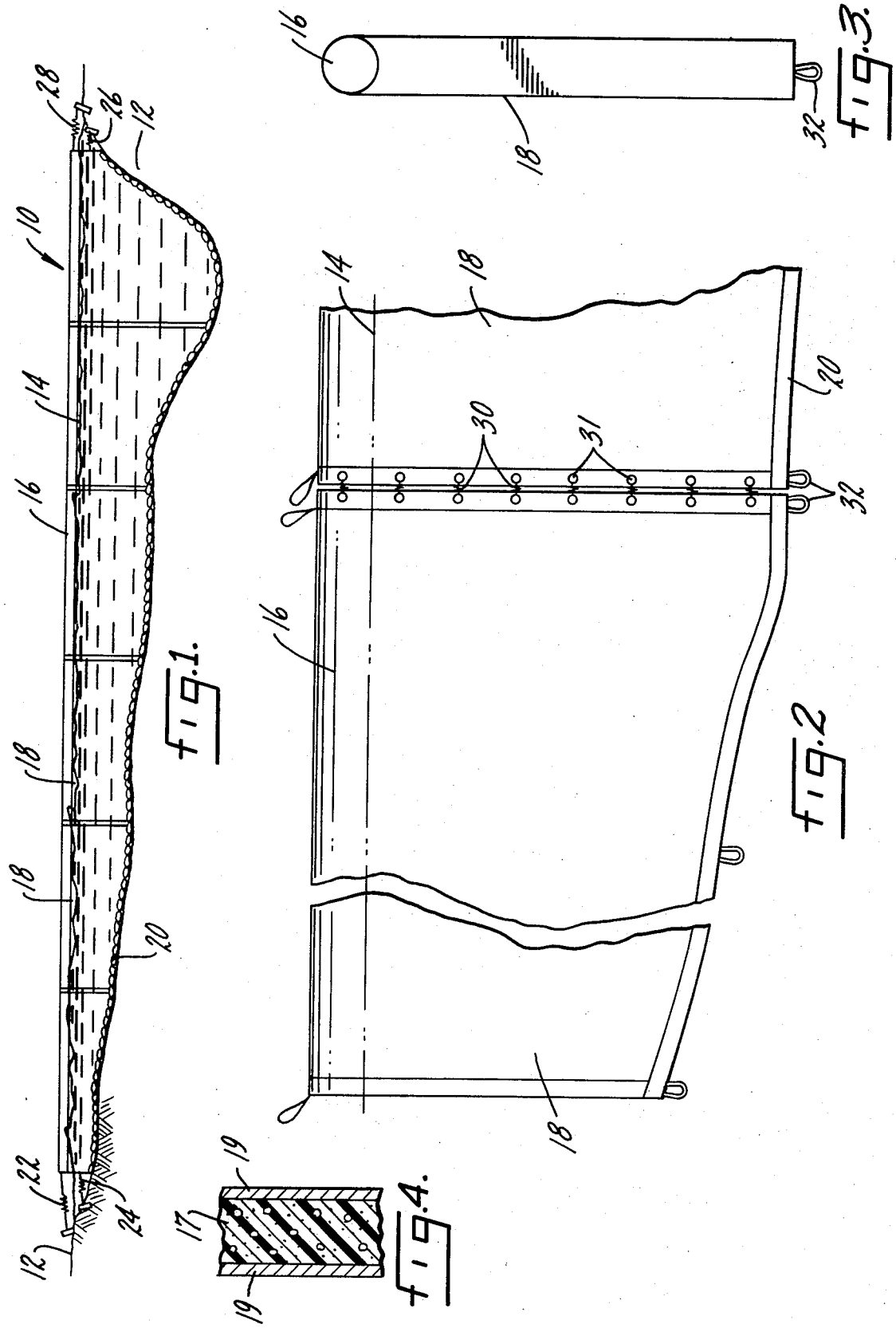

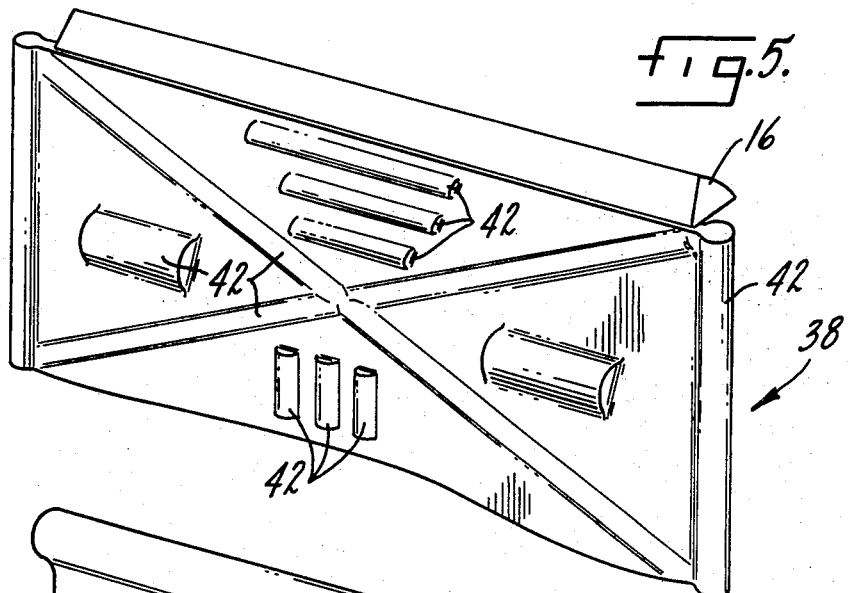
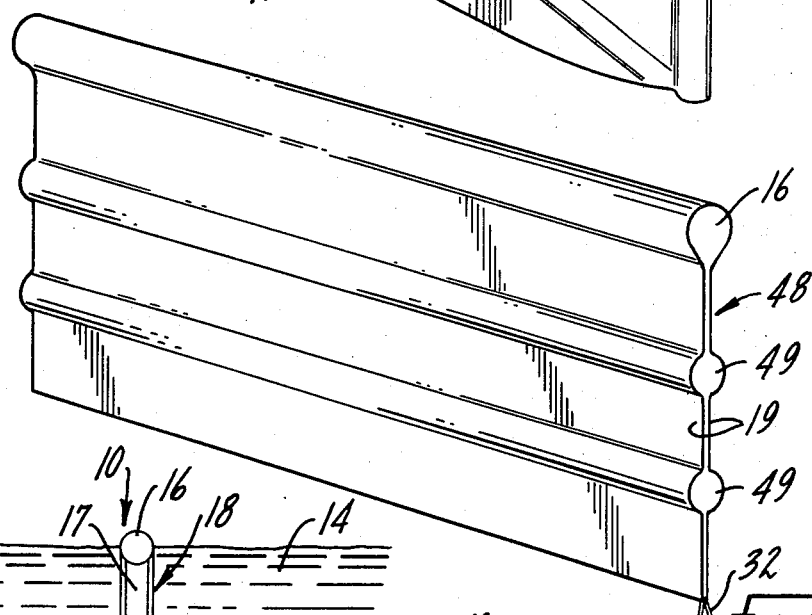
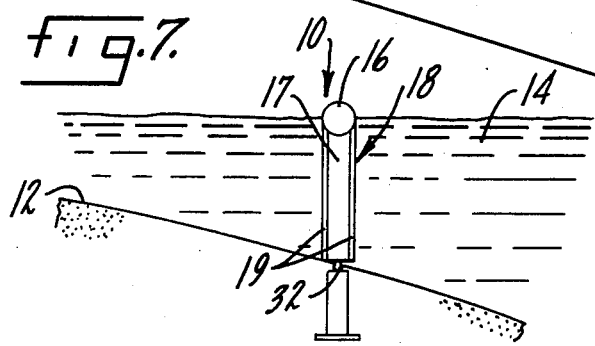
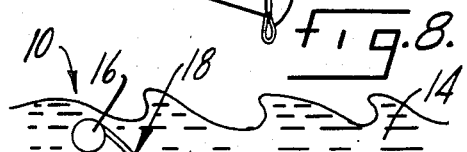
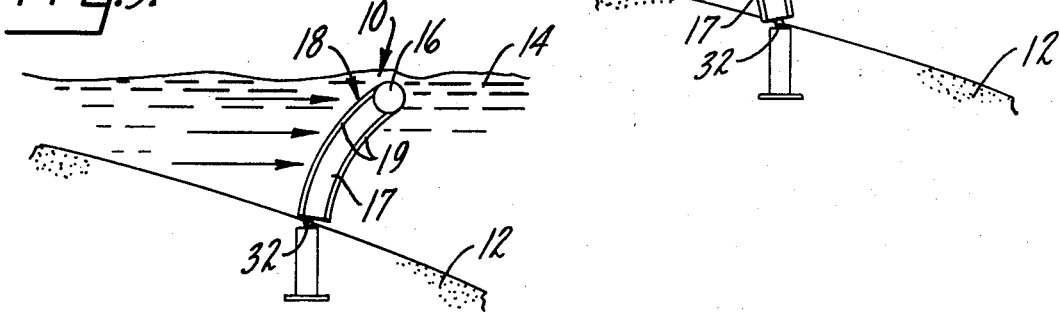

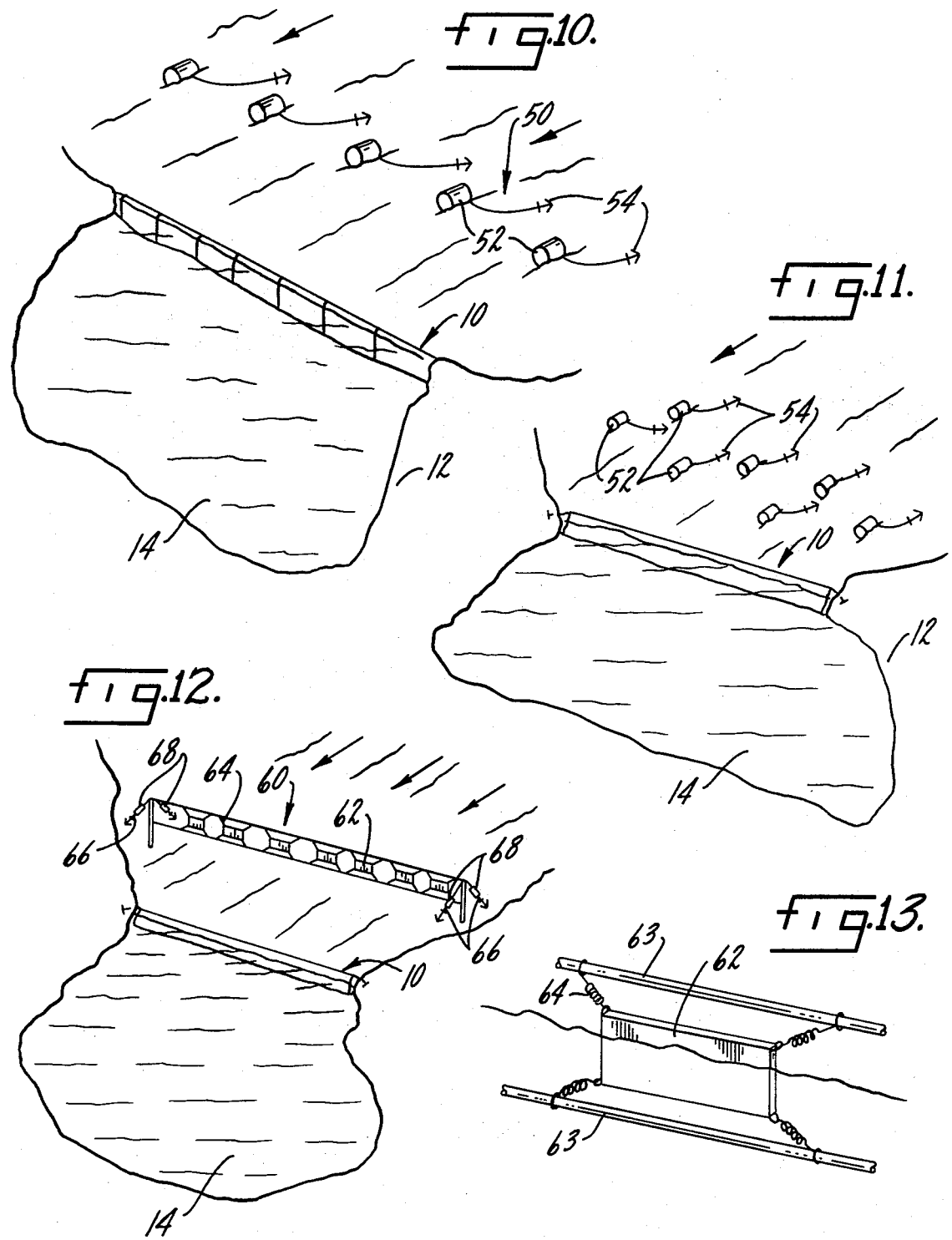

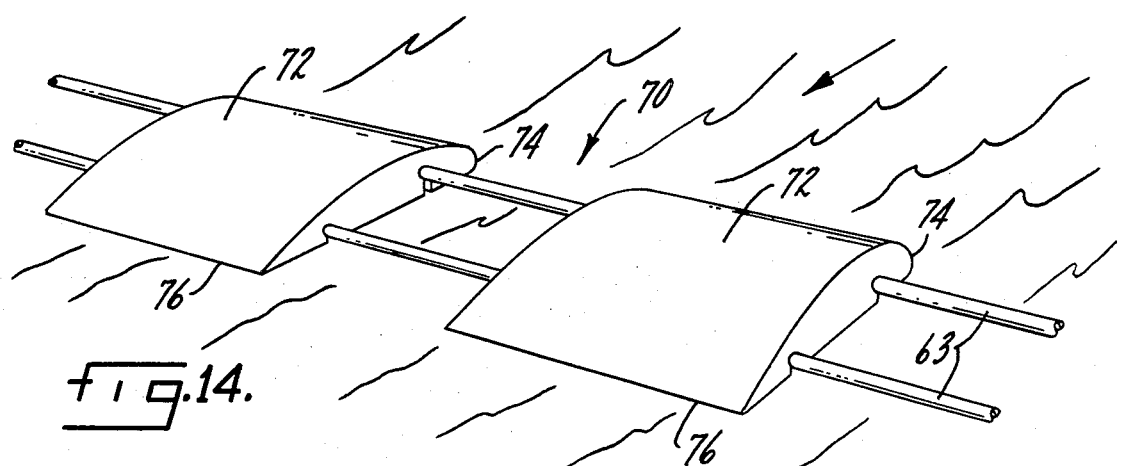
fig.14.
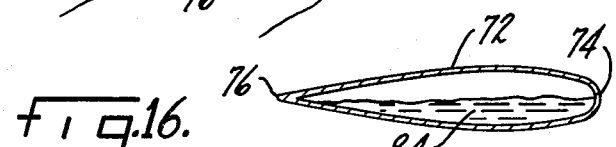
fig.15.
fig.16.
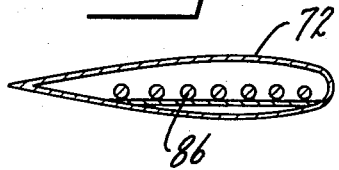
fig.17.
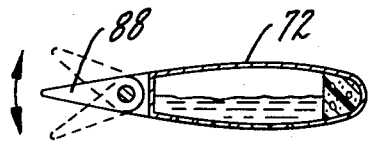
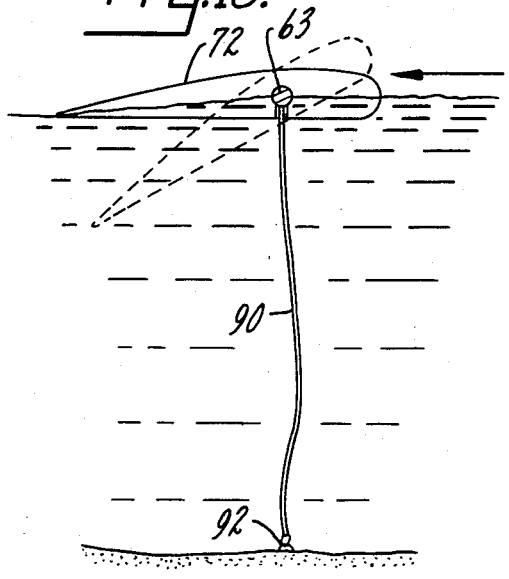
fig.18.
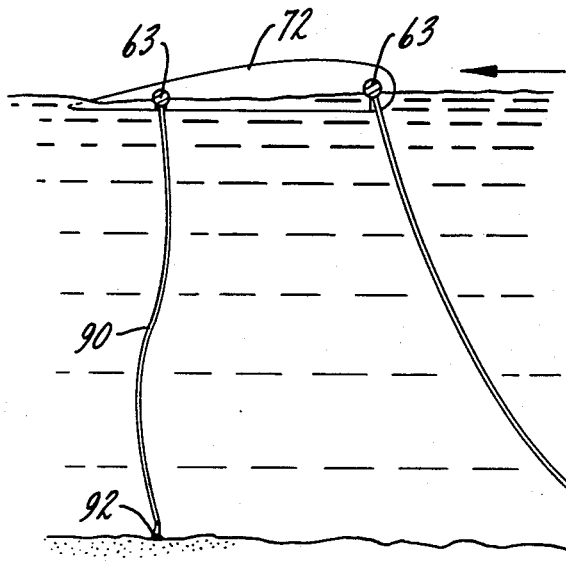
fig.19.

3,691,773

WATER BARRIER FLOTATION CURTAIN

BACKGROUND OF THE INVENTION

The present invention relates to a method and means for physically isolating a portion of a body of water in order to prevent that body of water from becoming polluted or contaminated.

In order to create an area in a body of water safe for swimming purposes, in an otherwise polluted body of water, a barrier curtain may be used to physically isolate the desired swimming area from the main body of water so that the water may be effectively treated with chlorine or other purification agents to reduce the bacteria content to a safe level for swimming purposes. Heretofore, it has been the general practice to utilize a barrier comprising a flotation device which consisted of long sections of large galvanized steel pipe or duct, filled with styrofoam and linked together by inflexible eye bolts to form a continuous train several hundred feet long and extending above the water surface some one to two feet. A fabric panel which was latched to the underside of the float tanks and the lower edge of the fabric was anchored to the lake bottom. This was accomplished by attachment to two piles which were permanently driven into the lake bottom.

A second system, which has heretofore been used, employed a vertical sheath whose upper edge was attached to a horizontal float extending one foot above the surface of the water. Both the upper edge of the vertical sheath and the lower edge of the vertical sheath were required to extend parallel to the water surface in order that the barrier function properly.

Although such devices have served the purpose, they have not proved entirely satisfactory under all conditions of service for the reasons that considerable difficulty has been experienced when turbulent conditions existed in the water. In turbulent conditions, the surface flotation device has, in many instances, broken away from the barrier curtain thereby rendering the curtain functionless since it is no longer buoyantly supported. In addition, inspection of the above curtains has shown that there has been extensive abrasion and breakage of the various fastening means linking the flotation tanks together and there have also been rips in the curtain at the points where the curtain and the flotation tanks met. This was caused due to mechanical stresses and some deterioration of the plastic-coated fabric.

When installed in bodies of water where there is no outer protective breakwall and the typography of the enclosed area and prevailing wind direction combined to produce heavy waves and turbulence, such systems have been entirely inadequate.

SUMMARY OF THE INVENTION

The general purpose of this invention is to provide a flexible water barrier which embraces all of the advantages of similarly employed water barriers and possesses none of the aforedescribed disadvantages. To attain this, the present invention contemplates utilizing a flexible water barrier of sandwich-like construction having a first flotation means within the flexible barrier adapted to float beneath the surface of the water and a flotation means which rides along the surface of the water and serves mainly as an obstacle to surface debris. An anchor is attached to the lower edge of the barrier to enable the barrier to substantially follow the contour of the floor of the body of water.

A second embodiment of the invention contemplates the use of a second barrier spaced apart from the first barrier and adapted to absorb a portion of the wave energy generated by the body of water prior to the wave energy reaching the first barrier. The second barrier is anchored at either end to the bottom of the body of water and is made essentially of a non-flexible material.

Therefore, an object of the present invention is to provide a flexible water barrier which will not tear or break apart under heavy wave conditions.

Another object is to provide a flotation device which, when installed in water, will provide a great area of safe, unpolluted water at substantially reduced cost.

A further object is to provide a water barrier which acts as a "travelling wave," i.e., ducking beneath the water during turbulent conditions, and thus, being able to withstand large amounts of turbulence.

Still another object is to provide a water barrier which is designed to float mainly beneath the surface of the water and not above the surface of the water.

Yet another object is to provide a water barrier which is extremely light to be put afloat like a simple fishing net.

A still further object is to provide a water barrier containing no inherently weak links.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 1 is a diagrammatic view of a preferred embodiment, showing a water barrier curtain installed in a body of water.

FIG. 2 is an enlarged view of a section of the water barrier curtain shown in FIG. 1.

FIG. 3 is an end view of the water barrier curtain shown in FIG. 2.

FIG. 4 is an enlarged view of a portion of the water barrier curtain shown in FIG. 3.

FIG. 5 is a diagrammatic view of an alternative embodiment of a section of a water barrier curtain.

FIG. 6 is a diagrammatic view of another alternative embodiment of a section of a water barrier curtain.

FIG. 7 is an end view of a water barrier curtain resting in still water.

FIG. 8 illustrates the deflection of the water barrier curtain of FIG. 7 during turbulent conditions.

FIG. 9 illustrates the deflection of the water barrier curtain of FIG. 7 during an overflow condition.

FIG. 10 is a diagrammatic view of an auxiliary barrier used in conjunction with the water barrier curtain of FIG. 1.

FIG. 11 is a diagrammatic view of an alternative configuration of an auxiliary barrier used in conjunction with the water barrier curtain of FIG. 1.

FIG. 12 is a diagrammatic view of an alternative construction for an auxiliary water barrier curtain.

FIG. 13 is an enlarged view of the auxiliary barrier curtain shown in FIG. 12.

FIG. 14 is a diagrammatic view of another alternative construction for an auxiliary barrier curtain.

FIG. 15 is an enlarged cross-sectional view of the auxiliary barrier shown in FIG. 14 when filled with water.

FIG. 16 is an enlarged cross-sectional view of the auxiliary barrier shown in FIG. 14 when filled with an energy-absorbing material other than water.

FIG. 17 is an enlarged cross-sectional view of the auxiliary barrier shown in FIG. 14 showing a pivotable trailing edge.

FIG. 18 is a diagrammatic view of the auxiliary barrier of FIG. 14 having a pivotable single-point attachment.

FIG. 19 is a diagrammatic view of the auxiliary barrier of FIG. 15 having a double point of attachment.

DESCRIPTION OF THE PREFERRED EMBODIMENT

Referring now to the drawings wherein like reference characters designate like or corresponding parts throughout the several views, there is shown in FIGS. 1 through 4, which illustrate the preferred embodiment, a water barrier flotation curtain 10 which is placed in a body of water such as a lake 14 in order to isolate a portion of the body of water and prevent it from becoming polluted. Water barrier flotation curtain 10 is normally placed across an inlet in the body of water and is anchored to the adjacent shoreline 12 by two sets of anchor means 22, 24 and 26, 28, respectively. Water barrier flotation curtain 10 comprises a buoyant flexible surface or panel 18. Panel 18 is of sandwich-like construction and comprises a pair of flexible fabric panels 19, sandwiched around a foam-like material 17. The foam-like material 17 serves as a flotation device beneath the surface of the water. Attached to the upper edge of buoyant panel 18 is a second floatation device 16. Lastly, an anchor or chain 20 is attached along the lower edge of flexible surface 18. This causes flexible surface or panel 18 to substantially follow the contour of the floor 15 of the body of water.

In prior water barrier curtains, the entire weight of the curtain has been supported by a surface flotation means. In water barrier curtain 10, the surface flotation device 16 acts mainly as a surface barrier to eliminate debris floating upon the surface of the body of water while the foam-like material 18 serves to support the weight of the water barrier curtain. As will be explained in greater detail below, by reducing the size of the surface float, during turbulent conditions, the surface float 16 may readily be pushed beneath the surface of the water thereby preventing damage to the curtain. Furthermore, by utilizing a buoyant underwater flotation system, i.e., foam-like material 17, in the event that the surface flotation means 16 or even small sections of the panel 18, are severed from the water barrier curtain 10, the water barrier 10 will still remain substantially effective.

When used in this manner, water barrier flotation curtain 10 is able to create an area of water which would be safe for swimming purposes in an otherwise polluted body of water such as a lake or a river. The water barrier flotation curtain 10 may be used to physically isolate the desired area from the main body of water so that it may be effectively treated with chlorine or other purification agents to reduce the bacteria content to a safe level for general swimming purposes.

Referring now to FIGS. 2 through 4 in conjunction with FIG. 1, the construction of water barrier flotation curtain 10 will be explained in more detail. In a preferred embodiment, water barrier flotation curtain 10 is composed of a plurality of sandwich-like fabric panels 18 which are fastened together by suitable flexible fastening means 30. These fastening means may comprise resilient springs attached to gromets 31 or may comprise any type of webbing or lacing which may also be wrapped around gromets 31 to flexibly connect one panel to the next. It can be seen that the right side of the first panel is connected to the left side of the second panel until a barrier is constructed, having N flexible panels, which is approximately the width of the sealed-off or isolated water area. The gromets may be fastened to flexible surface 18 in any conventional means. As can be seen in FIG. 4, flexible panel 18 is of buoyant sandwich-like construction having two outer surfaces 19 and an inner core 17. The outer surface may be comprised of any flexible type of plastic-like material or canvas material which has suitable characteristics to withstand tearing and bursting. Inner core 17 may be comprised of any closed cell foam core. This foam core provides a buoyancy to the sandwich construction. An anchor or chain 20 is connected to the lower edge of each fabric panel 18. This may be accomplished by utilizing loops 32 on the lower end of panel 18 or any other conventional fastening means. As mentioned previously, anchor 20 causes the lower edge of barrier 10 to substantially follow the contour 15 of the lake bottom.

As seen in FIG. 3 as well as FIG. 2, the fabric panels are connected to a small flotation cell 16 which is then placed along the surface of the water to act as a barrier against surface debris. The flotation cell 16 may take any shape that is desired and in a preferred embodiment may be comprised of any closed cell buoyant foam. Lastly, the outer ends of flexible water barrier flotation curtain 10 are fastened to the shoreline by cables 22, 24, 26 and 28. Preferably, these anchors should be resilient or should contain a shock absorber or spring to provide more flexibility to withstand sudden impact. In this manner, water barrier flotation curtain 10 is vertically oriented in the water. The weight of the barrier 10 is substantially supported by the foam-like material 17. Surface flotation cell 16 provides a small amount of support but mainly functions to eliminate or block surface debris. Where surface debris is not considered a problem, surface flotation cell 16 may be entirely eliminated.

FIG. 5 shows an alternative construction for a panel 38 which could be used to replace sandwich-like panel 18 in forming a continuous water barrier flotation curtain 10. The panel again consists of a sandwich-like structure. However, instead of having a continuous center foam core such as center foam core 17, preshaped sections of flotation material 42 are sewn between the outer surfaces of the panel such as shown in FIG. 5 in order to provide buoyancy beneath the surface of the water thereby relieving flotation cell 16 of the burden of supporting the entire weight of the water barrier flotation curtain 10. This panel is then laced in series to similar panels to form a water barrier flotation curtain 10 as described above.

FIG. 6 shows another alternative method of manufacturing a flotation panel 48. This panel may also be used to replace panel 18 in the water barrier flotation curtain 10. Panel 48 is of sandwich-like construction having two outer surfaces. A plurality of intermediate flotation elements 49 are placed between the two outer surfaces of panel 48. These intermediate flotation elements 49 serve substantially the same function as foam-like material 17 in FIG. 4. These flotation elements 49 may, in a preferred embodiment, be parallel to the upper surface of panel 48. The intermediate elements 49 are designed such that each intermediate flotation element 49 supports only the amount of panel immediately beneath it. As described above in connection with panels 18 and 38, a surface flotation cell 16 may also be attached to act as a barrier against surface debris and to aid in supporting the weight of panel 48.

All of the above methods of manufacturing panels, i.e. panels 18, 38 and 48, allow for the reduction in size of flotation cell 16 since flexible panels 18, 38 and 48 comprise certain buoyant materials. It will be recognized by one skilled in the art that any design or shape of buoyant material may be placed between the outer surfaces 19 of the flexible panels 18, 38 and 48 in order to act as a float and also as a barrier to surface debris and minor wave conditions.

Because of this flexible construction, water barrier flotation curtain 10 acts as a "travelling wave." During severe turbulence, curtain 10 will be pushed underwater and thereby be protected from breaking and tearing and the lower portions of the water barrier flotation curtain 10 will remain vertical due to the buoyancy of the intermediate flotation elements, i.e. foam-like material 17 or elements 42 or 49. FIGS. 7, 8 and 9 illustrate the deflection of water barrier flotation curtain 10 during varying conditions of the water. FIG. 7 depicts the water barrier flotation curtain 10 in still water. It can be seen that flexible curtain 18 remains substantially vertical. FIG. 8 is representative of a turbulent storm condition with large incoming waves. As can be seen, flotation cell 16 is pushed underwater and flexible panel 18 temporarily deflects to yield to the force of the waves. FIG. 9 shows the condition where there is an overflow on the shore and the water barrier flotation curtain 10 will deflect in the opposite direction.

Because it is desirable to reduce the magnitude of the wave action impinging and breaking at the location of water barrier flotation curtain 10, it is sometimes necessary to construct an auxiliary barrier means 50, shown in FIG. 10, which would act to break up and absorb a portion of the energy of the incoming wave action, thereby lessening the turbulence in the area of the main water barrier flotation curtain 10. Generally, auxiliary barrier 50 is placed parallel to main barrier 10 and separated therefrom as shown in FIG. 10. Many alternative constructions may be utilized for auxiliary barrier 50 and these may be used in conjunction with any of the alternative constructions for main barrier 10 described above. FIG. 10 shows a series of floating drums 52 anchored to the floor of the body of water by anchor 54. These drums 52 are arranged in a straight line and act to absorb a portion of the energy of the incoming waves.

FIG. 11 shows an alternative arrangement of drums 52. Here the drums are staggered and, in effect, form two parallel lines or two auxiliary barriers. By staggering the drums, a greater effectiveness may be achieved.

The same effect can be achieved by an auxiliary barrier 60 comprised of spring mounted plates 62 as shown in FIG. 12. The spring mounted plates 62 may be placed either above or below the surface of the water. The construction of auxiliary barrier 60 is more clearly shown in FIG. 13. Plate 62 is of rigid material and may be solid or perforated. It is attached to a pair of rods or cables 63 by a spring means 64. While coil springs are shown, any form of resilient attachment may be utilized. As shown in FIG. 12, a series of plates 62 are attached to rods 63 constituting the auxiliary barrier 60. The auxiliary barrier is anchored on either end to the water floor by resilient anchor cables 66. In a preferred embodiment, anchor 66 is connected to auxiliary barrier 60 through the use of a shock absorber 68. Again, it will be recognized by one skilled in the art that any suitable form of anchoring may be utilized so long as there is a resiliency to absorb sudden shock waves.

FIG. 14 shows an alternative form for constructing an auxiliary barrier 70. In this form, the spring mounted plates 62 of auxiliary barrier 60 are replaced by a series of air foil-like structures 72. The air foils have a leading edge 74 and a trailing edge 76. Preferably, the air foils 72 are hollow and are, therefore, buoyant. They are attached to support rods 63 in a conventional manner. As shown in FIG. 14, two support rods are utilized. Briefly referring to FIG. 18, it is shown that air foils 72 may be pivotally mounted on only one support rod 63 or may be mounted on two support rods 63 as shown in FIG. 14 and FIG. 19. Auxiliary barrier 70 is again placed approximately parallel to water barrier flotation curtain 10 but spaced apart therefrom to absorb the energy of the incoming waves. The lead edges of the air foils are placed towards the wave while the trailing edges are placed towards main water barrier flotation curtain 10. By utilizing an air foil 72 as the main component of auxiliary barrier 70, the air foil acts to absorb wave energy and reduce the sea state in the area behind the auxiliary barrier as they are lifted and twisted by the wave as it passes over the auxiliary barrier. To obtain additional damping action, hollow air foil 72 may be filled with water 84 as shown in FIG. 15 or may be filled by any energy-absorbing device such as rolling bars 86 shown in FIG. 16. It will be recognized by one skilled in the art that any energy-absorbing material may be utilized to promote this damping action. FIG. 17 shows an alternative configuration of the air foil utilizing a flexible tailpiece 88 pivotally mounted to form the trailing edge of the air foil. By having a pivoting trailing edge, further damping of the wave action may be obtained.

FIGS. 18 and 19 show the effect of mounting air foils 72 with either one fixation point as shown in FIG. 18, or two fixation points as shown in FIG. 19.

It will be recognized by one skilled in the art that air foil 72 may also be used to replace flotation cell 16 of the water barrier flotation curtain 10 and thus, form a portion of the main barrier curtain 10. It will also be recognized that a main barrier curtain utilizing air foils 72 on the surface may be used in conjunction with an auxiliary barrier curtain or may be used alone. When utilizing an air foil to form the auxiliary barrier, it is preferable to also incorporate an additional flexible piece of material 90 which is attached to the underside of air foils 72. The upper edge of the flexible material is attached to the underside of air foils 72 while the lower edge is anchored to the bottom or the floor of the body of water by suitable anchoring means 92 as shown in FIG. 18. When two support rods 63 are utilized to support air foils 72, the flexible material 90 is attached to only one support rod while an anchor 94 is connected to the other support rod, thereby forming a double anchoring for the air foil. As the wave approaches the air foil, float 72 tilts upwardly as the wave increases thereby straightening barrier curtain 90 and, in effect, absorbing much of the energy of the incoming wave. In FIG. 19, anchor 94 merely acts as a stabilizing means to prevent the air foil from rising too high.

It will be recognized by one skilled in the art that an effective water barrier flotation curtain may be obtained by utilizing only a main water barrier flotation curtain 10. However, in certain instances it is necessary to use an auxiliary barrier. It will be recognized that any one of the auxiliary barriers disclosed, i.e. 50, 60, 70, may be utilized with any of the alternative constructions for main barrier 10. Furthermore, it will be recognized that in all of the above alternative embodiments, it is generally desired to greatly reduce or eliminate altogether, the buoyancy requirements of the surface flotation cell 16 so that it may be designed of any size and shape desired to act as an obstacle to surface debris and minor wave conditions but will readily be pushed underwater and protected from breaking and tearing action of heavy wind and wave conditions. It should be understood, of course, that the foregoing disclosure relates only to preferred embodiments of the invention and that numerous modifications or alterations may be made therein without departing from the spirit and the scope of the invention as set forth in the appended claims.

What is claimed is:

1. A water barrier flotation curtain for use in a body of water comprising:
    a first barrier means of sandwich-like construction, substantially vertical, having an upper edge and a lower edge;
    first flotation means positioned within said first barrier means and adapted to float beneath the surface of said water;
    a second flotation means attached to said upper edge of said first barrier means wherein said second flotation means rests on the surface of said water wherein said second flotation means is adapted to support the portion of said first barrier means between said first flotation means and said second flotation means and wherein said first flotation means supports the remainder of said first barrier means; and
    first anchor means attached to said lower edge of said first barrier means wherein said lower edge of said first barrier means substantially follows the contour of the floor of said body of water.

2. The water barrier flotation curtain of claim 1 wherein said first barrier means comprises:
    N flexible panels, of sandwich-like construction, where N is a positive integer, each panel having an upper edge, a lower edge, a first side edge and a second side edge;
    means for connecting said first side edge of said first panel to said second side edge of said second panel; and
    means for connecting said first side edge of said second panel to said second side edge of said Nth panel, thereby forming a continuous barrier means wherein said upper and lower edges of said panels form said upper and lower edges of said first barrier means respectively.

3. The water barrier flotation curtain of claim 2 wherein said sandwich-like panels comprise:
    a first and second flexible outer surface; and
    a foam-like material sandwiched between said first and second outer surfaces and wherein said foam-like material comprises said first flotation means.

4. The water barrier flotation curtain of claim 3 wherein said foam-like material is distributed uniformly between said first and second outer surfaces.

5. The water barrier flotation curtain of claim 3 wherein said foam-like material is randomly distributed between said first and second outer surfaces.

6. The water barrier flotation curtain of claim 5 wherein said second flotation means comprises a plurality of flotable air foils disposed along the surface of said water and pivotally connected to said upper edge of said first barrier means.

7. The water barrier flotation curtain of claim 6 wherein said air foils are hollow.

8. The water barrier flotation curtain of claim 7 wherein said hollow air foil is partially filled with an energy absorbing means.

9. The water barrier flotation curtain of claim 8 wherein said energy absorbing means comprises water.

10. The water barrier flotation curtain of claim 9 wherein each of said air foils includes a pivotable edge.

11. The water barrier flotation curtain of claim 10 further comprising:
    a second barrier means spaced apart from said first barrier means and adapted to absorb a portion of the wave energy of said body of water prior to said wave energy reaching said first barrier means.

12. The water barrier flotation curtain of claim 11 wherein said second barrier means comprises:
    a plurality of elements adapted to float on surface of said water; and
    anchor means associated with each of said flotation elements to secure each of said elements to the floor of said body of water.

13. The water barrier flotation curtain of claim 12 wherein said plurality of flotation elements are arranged substantially parallel with said first barrier means.

14. The water barrier flotation curtain of claim 12 wherein said plurality of flotation elements are arranged in a plurality of rows, each of said rows being substantially parallel with said first barrier means.

15. The water barrier flotation curtain of claim 11 wherein said second barrier means comprises:
    a plurality of substantially vertically disposed rigid plates;
    means connecting said rigid plates to form a second continuous barrier; and
    flexible anchor means connected to said second continuous barrier to fixedly secure said second barrier in position in said body of water.

16. The water barrier flotation curtain of claim 11 wherein said second barrier means comprises:

a plurality of flotable air foils disposed along the surface of said water;

means connecting said air foils to form a second continuous barrier; and flexible anchor means connected to said second continuous barrier to fixedly secure said second barrier in position in said body of water.

17. The water barrier flotation curtain of claim 16 wherein said air foils are hollow.

18. The water barrier flotation curtain of claim 17 wherein said hollow air foil is partially filled with an energy absorbing means.

19. The water barrier flotation curtain of claim 18 wherein said energy absorbing means comprises water.

20. The water barrier flotation curtain of claim 16 wherein each of said air foils includes a pivotable edge.

21. The water barrier flotation curtain of claim 19 wherein said second barrier means further comprises a pivotable edge connected to each of said air foils.

22. A water barrier flotation curtain for use in a body of water comprising:

N substantially vertical flexible panels, where N is a positive integer, of sandwich-like construction, said panels each comprising a first and second flexible outer surface having a foam-like material sandwiched between said first and second outer surfaces, said foam-like material constituting a first flotation means adapted to float beneath the surface of said water, and wherein each of said panels having an upper edge, a lower edge, a first side edge and a second side edge;

means for flexibly connecting said first side edge of said first panel to said second side edge of said second panel;

means for flexibly connecting said first side edge of said second panel to said second side edge of said Nth panel thereby forming a continuous flexible barrier;

second flotation means attached to said upper edges of each of said panels wherein said second flotation means rests on the surface of said water and acts as an obstacle to surface debris; and auxiliary barrier means spaced apart from said N substantially vertical panels wherein said auxiliary barrier means is adapted to absorb a portion of the wave energy of said body of water prior to said wave energy reaching said N substantially vertical panels.

23. The flotation curtain of claim 22 wherein said flexible barrier means comprises a plurality of panels serially and resiliently connected.

24. The water barrier flotation curtain of claim 23 further comprising:

a second barrier means spaced apart from said first barrier means and adapted to absorb a portion of the wave energy of said body of water prior to said wave energy reaching said first barrier means.

25. A water barrier flotation curtain for use in a body of water comprising:

N substantially vertical flexible panels, where N is a positive integer, of sandwich-like construction, said panels each comprising a first and second flexible outer surface having a foam-like material sandwiched between said first and second outer surfaces, said foam-like material constituting a first flotation means adapted to float beneath the surface of said water, and wherein each of said panels having an upper edge, a lower edge, a first side edge and a second side edge;

means for flexibly connecting said first side edge of said first panel to said second side edge of said second panel;

means for flexibly connecting said first side edge of said second panel to said second side edge of said Nth panel thereby forming a continuous flexible barrier;

second flotation means attached to said upper edges of each of said panels wherein said second flotation means rests on the surface of said water and acts as an obstacle to surface debris;

first anchor means attached to said lower edges of said panels wherein said lower edge of said continuous flexible barrier substantially follows the contour of the floor of said body of water;

second anchor means connected to said second edge of said first panel wherein said second anchor means is capable of absorbing shock waves; and third anchor means connected to said first edge of said Nth panel, said third anchor means being capable of absorbing shock waves, wherein said second and third anchor means cooperate to fix the position of said continuous barrier by securing said barrier to said shoreline adjacent to said body of water and to said floor of said body of water.

26. A water barrier flotation curtain for use in a body of water comprisinG:

a first flexible barrier means, substantially vertical, having an upper edge and a lower edge;

surface flotation means attached to said upper edge of said first barrier means wherein said surface flotation means rests on the surface of said water and acts as an obstacle to surface debris; and intermediate flotation means attached to said flexible barrier means between said surface flotation means and said first anchor means wherein said surface flotation means is adapted to support the portion of said flexible barrier means between said first flotation means and said intermediate flotation means and wherein said intermediate flotation means supports the remainder of said flexible barrier means and wherein said intermediate flotation means comprises a plurality of flotation elements connected to said flexible barrier means and substantially parallel to said surface flotation means and wherein each of said flotation elements is adapted to support that portion of said flexible barrier means which is attached immediately beneath it.

* * * * *